(12) United States Patent
Watanabe et al.

(10) Patent No.: US 7,171,041 B2
(45) Date of Patent: Jan. 30, 2007

(54) POSITION-ORIENTATION RECOGNITION DEVICE

(75) Inventors: Atsushi Watanabe, Tokyo (JP); Katsutoshi Takizawa, Yamanashi (JP); Kazunori Ban, Yamanashi (JP)

(73) Assignee: Fanuc Ltd., Yamanashi (JP)

( * ) Notice: Subject to any disclaimer, the term of this patent is extended or adjusted under 35 U.S.C. 154(b) by 553 days.

(21) Appl. No.: 09/950,794

(22) Filed: Sep. 13, 2001

(65) Prior Publication Data

US 2002/0034327 A1 Mar. 21, 2002

(30) Foreign Application Priority Data

Sep. 20, 2000 (JP) .............................. 2000-285526

(51) Int. Cl.
*G06K 9/00* (2006.01)
*G06T 15/00* (2006.01)

(52) U.S. Cl. .................. 382/154; 345/419; 348/42

(58) Field of Classification Search ................ 382/154, 382/285; 345/419–427; 356/12–14; 348/42–60; 359/462–477; 352/57–65; 33/20.4; 353/7–9; 378/41–42; 396/324–331
See application file for complete search history.

(56) References Cited

U.S. PATENT DOCUMENTS

| 4,985,846 | A | 1/1991 | Fallon |
| 5,345,675 | A | 9/1994 | Yamanaka et al. |
| 5,987,591 | A * | 11/1999 | Jyumonji .................... 700/259 |
| 6,414,711 | B2 * | 7/2002 | Arimatsu et al. ............. 348/86 |
| 6,529,627 | B1 * | 3/2003 | Callari et al. ............... 382/154 |

FOREIGN PATENT DOCUMENTS

EP     0 812 662 A1    12/1997

\* cited by examiner

*Primary Examiner*—Jingge Wu
*Assistant Examiner*—Aaron Carter
(74) *Attorney, Agent, or Firm*—Staas & Halsey LLP

(57) ABSTRACT

Upon reception of a work sensing command from a robot controller, an image processing unit obtains a two-dimensional image of thee whole work pallet including a work, with a CCD camera (a first sensor means). A line of sight is calculated based on the work position on the sensed two-dimensional image. The robot controller determines the destination of movement of the robot such that a crossing line LC of slit beams LB1, LB2 of a laser sensor (a second sensor means) can agree with the calculated line of eight. The image processing unit operates the laser sensor so as to surely irradiate the laser slit beams LB1, LB2 to the target work, permitting the laser sensor to sense the three-dimensional positional and orientation of the target work.

10 Claims, 7 Drawing Sheets

POSITION-ORIENTATION RECOGNITION DEVICE

BACKGROUND OF THE INVENTION

1. Field of the Invention

This invention relates to a position-orientation recognition device applicable to a variety of factory automations, and more specifically, to a compound position-orientation recognition device comprising a sensor for obtaining two-dimensional information and a sensor for obtaining three-dimensional information.

2. Description of the Prior Art

Sensing the position and shape of different target works with various sensors is frequently required in assembling and machining operations or the like in a manufacture line. A sensor capable of obtaining a two-dimensional image is generally used for measurement of the position of the target work on the whole. If a CCD camera is used, for instance, a comparatively wide visual field can easily be provided by properly selecting an optical system (a lens). On the other hand, a laser sensor is effectively used for three-dimensional measurement of the local position and shape of the target work.

Laser sensors can be easily attached to a wrist portion of a robot and can measure the position and shape or the like of details of the target work accurately and on the real time base by irradiating laser beams from very close quarters to the target work, when designed to take the output from the laser sensor in a robot controller. For that reason, a laser sensor is frequently mounted on a robot system or the like, permitting the application to extensive fields including are welding, sealing and measurement or the like, for instance.

The laser sensor is classified into a type to scan with a laser beam in the form of a spot beam and another type to project a slit beam. In use of either type of the laser sensor, it is necessary to irradiate the spot or slit beam onto a target work surface surely. If the target work is located at a fixed position with a certain degree of accuracy and further a position close to the fixed position is taught to the robot as an approach position in advance, then it is easy to produce a state where a spot beam or slit beam is ready to be irradiated onto the target work surface rapidly.

However, in many cases according to an application, the position of a target work may remain unknown because positioning is not carried out or the accuracy of positioning of the target work is not reliable. In such a case, it is not possible to start a main measurement (shape measurement, for instance) with the laser sensor until the target work is found by search with the spot light beam or slit beam of the laser beam as a probe, while moving the laser sensor with a transfer means such as a robot.

In general, laser sensors are not suitable for measurement in a wide area, taking a time for searching for the target work and subsequent approaching to the target work. According to the circumstances, it may be difficult to cause a laser sensor to search a target work surely.

OBJECT AND SUMMARY OF THE INVENTION

It is an object of the present invention to provide a recognition device, which makes it possible to use a senor such as a laser sensor only applicable to sense a relatively narrow area, and besides, permits the sensor to surely recognize two-dimensional or three-dimensional information of a target work in a proper position and orientation, even if the position and orientation of the target work remain unknown.

A recognition device according to the present invention includes, as prerequisite components, a first sensor means for obtaining two-dimensional information within a target area and a second sensor means for obtaining information within a relatively narrower target area than the above target area. In the present invention, the information obtained by the second sensor means is two-dimensional or three-dimensional information.

According to the basic characteristics of the present invention, the recognition device comprises means for finding a spatial straight line connecting the target work with the first sensor means based on the position and orientation of the first sensor means and the two-dimensional information including information on a target work, obtained by the first sensor means, means for finding such position and orientation of the second sensor means, which permits the second sponsor means to recognize the target work, from the above straight line and means for moving the second sensor means to the position and orientation thus found.

According to the recognition device of the present invention, the second sensor means obtains two-dimensional information of a target work or three-dimensional position and orientation information of the target work to recognize the two-dimensional or three-dimensional information of the target work, after the transfer means moves the second sensor means to the found position and orientation.

The second sensor means is for obtaining the two-dimensional information, and the first sensor means may be also used for the second sensor means. The second sensor means has a light projecting means and a photo-detection means and may be also provided with a function for three-dimensional measurement of the position and orientation.

In this case, the photo-detection means may be provided as a two-dimensional sensor for obtaining the two-dimensional information, and the second sensor means is also allowed to serve as the first sensor means.

When the second sensor means has a light projecting means and a photo-detection means and is provided with the function for three dimensional measurement of the position and orientation, the position and orientation of the second sensor means for recognition of the target work may be determined such that; the direction of irradiation from the light projecting means agrees with the above found straight line (the straight line connecting the target work with the first sensor means) or that the direction of an optical axis of the photo-detection means agrees with the above straight line.

In either case described above, means for obtaining the spatial straight line or means for finding the position and orientation of the second sensor means may be provided in a robot controller of an industrial robot. Further, the industrial robot may be used as the means for moving the second sensor means to the position and orientation found as a suitable place for recognition.

An important point of the present invention is that after finding the spatial (actually three-dimensional spatial) "straight line" connecting the first sensor means with the target work in case of searching for the target work with the first sensor means capable of obtaining the two-dimensional information within the relatively wide area, "the found straight line" is used for determining "the position and orientation suitable for recognition (measurement) of the target work" for the second sensor means suitable for obtaining the two-dimensional or three-dimensional information within the relatively narrow area.

According to the specific procedure, the recognition device recognizes the position of the target work on the two-dimensional image of the target area by firstly obtaining the two-dimensional image of the target area with the first sensor, and then processing the obtained two-dimensional image to find the target work on the two-dimensional image In the present invention, "the target area" means an area enough to cover the range supposed that there is a possibility of the existence of the target work.

It comes out in this stage that the (actually three-dimensional) spatial position of the target work is on a "line of sight" with which the camera of the first sensor seizes the target work. On the other hand, the distance between the camera and the target work on the line of sight remains unknown. The "line of sight" may be determined based on data obtained by camera calibration of the first sensor as a straight line connecting the center of a camera lens with an imaging position of the target work on the imaging plane as known per se.

That is, the relation between the "imaging position of the target work on the imaging plane" or the "position of the target work on the image" and the "position and direction of the line of sight" can be recognized based on the data obtained by camera calibration.

Generally speaking, if a position (u, v) on an image (two-dimensional) space is found, then the line of sight (a straight line) passing through the position is found. An equation given by the line of sight (the straight line) is also called an "equation of a line of sight".

Accordingly, the line of sight can be used as the "straight line connecting the first sensor means with the target work". Strictly speaking, it should be noted that the "position of the target work" means "the position of a certain point (which will be referred to as a representative point) on the target work, and as a result, the "straight line connecting the fist sensor moans with the target work" is equivalent to a "straight line connecting the first sensor means with the representative point on the target work".

In this connection, the "straight line connecting the first sensor means with the target work" obtained as described above is effectively utilized for determining the position and orientation of the second sensor which is suitable for more detailed recognition (of more accurate position, orientation, shape and dimension or the like of the target work).

Because, as the target work surely exists on the "spatial straight line" thus found, the target work can be sensed surely if the second sensor is moved to a position on the spatial straight line or a position close to the spatial straight line and the visual field of the second sensor is oriented in the direction matching the above straight line.

For instance, if the second sensor has a light projecting means and a photo-detection means and is provided with the function for three-dimensional measurement of the position and orientation, it is enough to determine the orientation of the second sensor based on the direction of irradiation or the direction of the optical axis of the photo-detection means.

BRIEF DESCRIPTION OF THE DRAWINGS

The foregoing and other objects and features of the invention will become apparent from the following description of preferred embodiments of the invention with reference to the accompanying drawings, in which:

FIG. 3 is a view showing the positional relation among two planes carrying two laser slit beams LB1, LB2, a crossing line LC of these two laser slit beams, a laser beam irradiation section and a photo-detection section or the like;

DETAILED DESCRIPTION OF THE PREFERRED EMBODIMENTS

Figure 1:
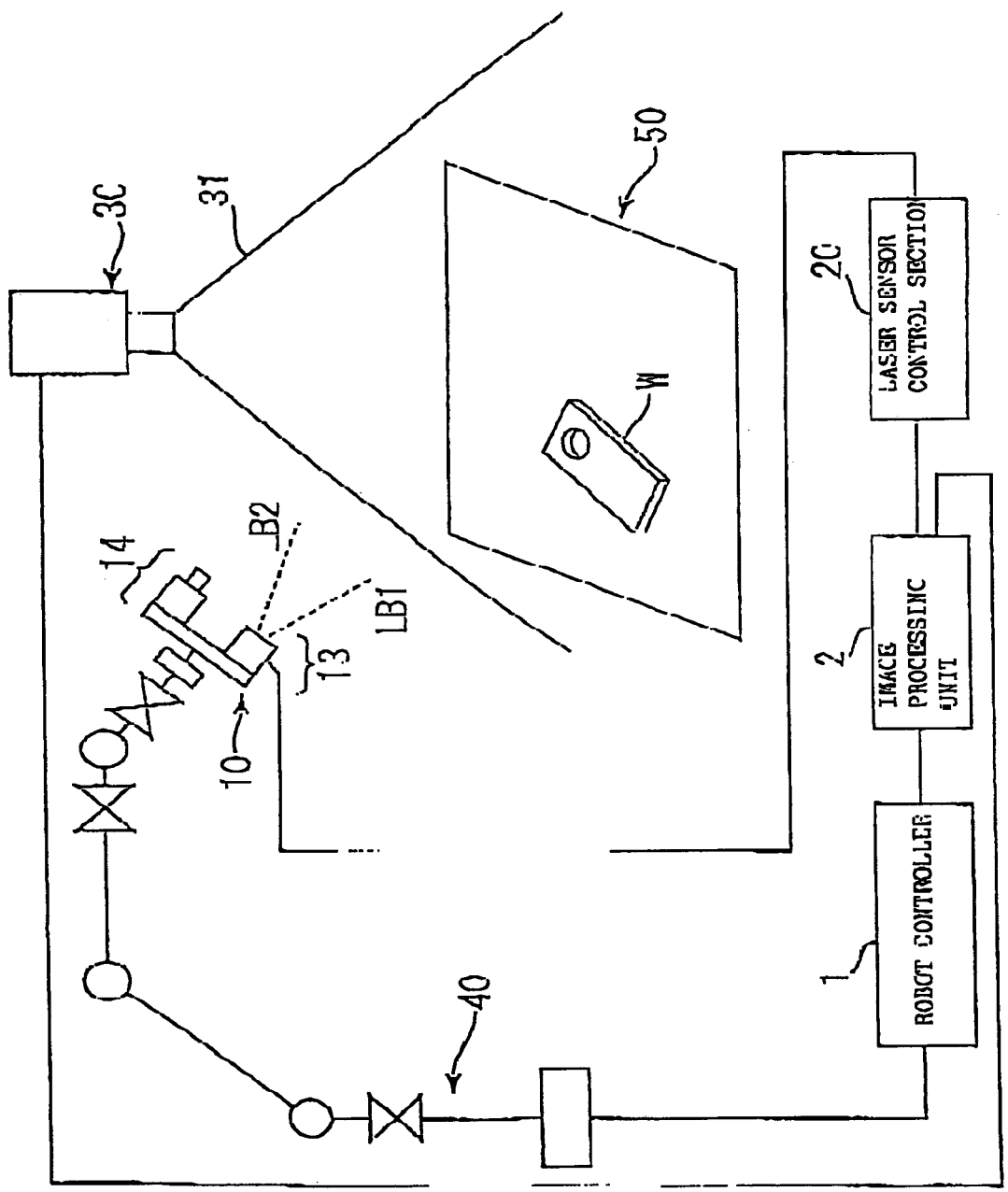
FIG. 1 illustrates an outline of the overall arrangement of a three-dimensional position-orientation recognition device according to a first embodiment of the present invention.

A description will be firstly given of an outline of a three-dimensional position-orientation recognition device according to a first embodiment of the present invention with reference to FIG. 1. This three-dimensional position orientation recognition device is applied to handling (pickup and carriage) of works with an industrial robot), for instance. In the present embodiment, it is assumed that a plurality of works are placed at different positions and orientations. This position-orientation recognition device fulfills its characteristics in starting handling the works placed in the above state.

As shown in FIG. 1, the position-orientation recognition device comprises a robot controller 1, an image processing unit 2, a laser sensor body section (which will be hereinafter simply referred to as a laser sensor) 10, a laser sensor control section 20, a CCD camera 30 and a robot 40.

The laser sensor 10 is mounted to a wrist portion (in the vicinity of a tool center point (TCP)) of the robot 40. The CCD camera 30 is installed above a work pallet 50, for instance, without being mounted to the robot 40. The CCD camera 30 and the image processing unit 2 constitutes a wide area sensor (a first sensor means). For that reason, the installation position and orientation of the CCD) camera 30 are determined such that a visual field 31 of the CCD camera may cover the entirety of the work pallet 50 provided as a supply area of a work W.

It is assumed that calibration of the CCD camera 30 for obtaining information on the relation between a position (u, v) on an image (two-dimensional) space and a line of sight (a straight line) in advance has been already finished. Data representing the relation between a position (u, v) on an image and a position on a three-dimensional coordinate system (an appropriately set work coordinate system) is stored in a memory in the image processing unit 2 in advance.

Figure 2:
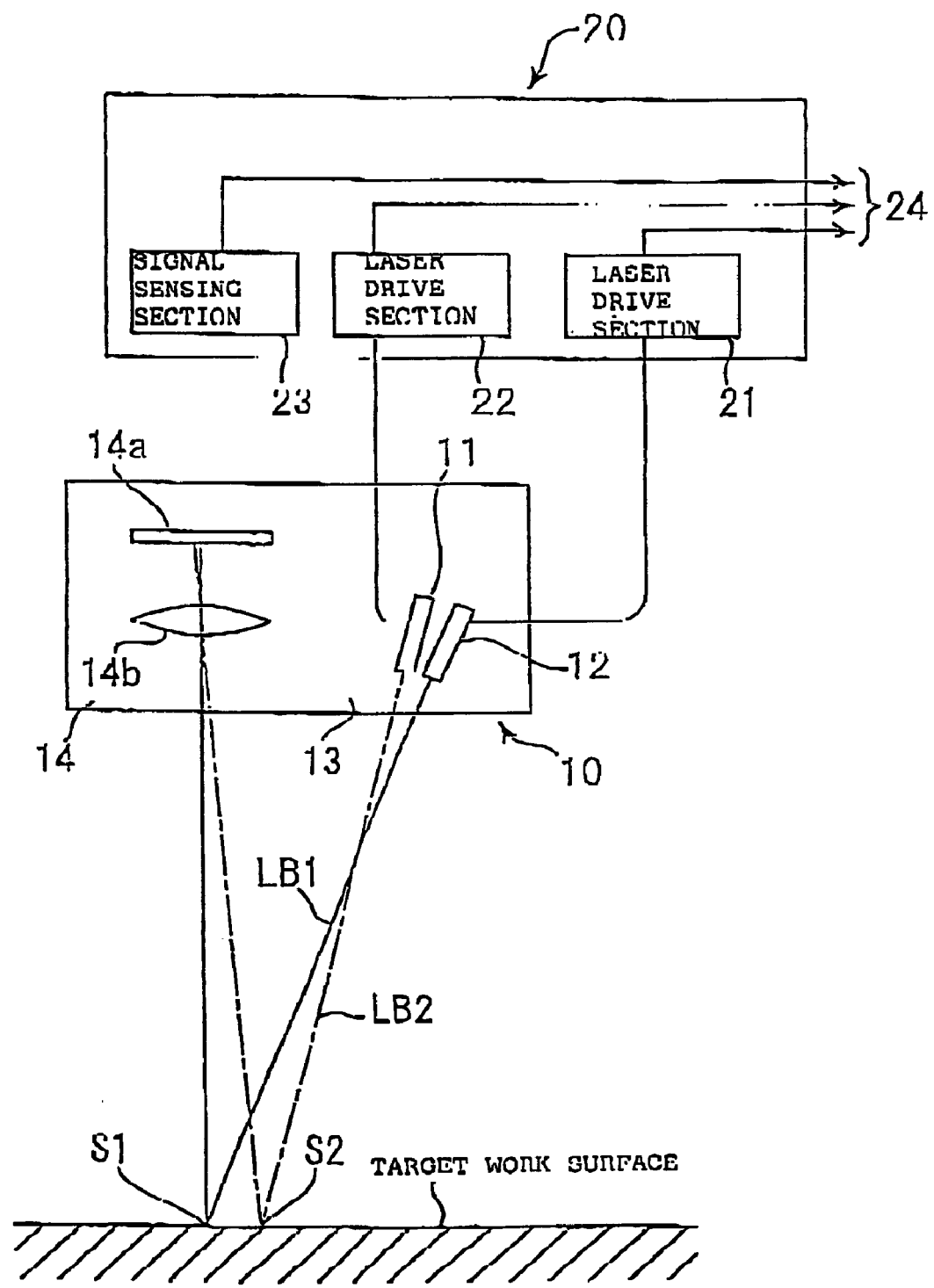
FIG. 2 illustrates an outline of the configuration and operation of a laser sensor.

The laser sensor 10 used as a narrow area sensor (a second sensor means) may be of either well-known type of spot beam irradiation or slit beam irradiation. However, a description will now be given of the position-orientation recognition device in case of using the sensor of the latter type with reference to FIG. 2.

A laser beam irradiation section 13 of the laser sensor 10 has first and second laser oscillators 11, 12, while a photo-detection section (a photo-receiving section) 14 has a photo detector 14a and an optical system 14b for image formation. The first and second laser oscillators 11, 12 output first and second slit beams LB1, LB2 respectively through a cylindrical lens placed in the vicinity of each irradiation opening.

The laser sensor 10 is connected to the image processing unit 2 through the laser sensor control section 20. The CCD camera 30 is also connected to the image processing unit 2. As described above, the image processing unit 2 is used by the laser sensor (the body section 10 and the control section 20) and also by the CCD camera 30.

Upon reception of a laser sensor operation command from the image processing unit 2 through a line 24, first and second laser drive sections 21, 22 start driving the first and second laser oscillators 11, 12 to generate first and second laser slit beams LB1, LB2.

Laser beams subjected to diffuse reflection from a reflection point S1 (a point of incidence of a desired single beam L1 in the first slit beam LB1) and a reflection point S2 (a point of incidence of a desired single beam L2 in the second slit beam LB2) on the surface of the target work form an image on the photo detector 14a by means of the optical system 14b according to the positions of the reflection points S1, S2. CCD or the like is applicable to the photo detector. In tho present embodiment, a two-dimensional CCD array is used as the photo detector 14a.

Figure 3:
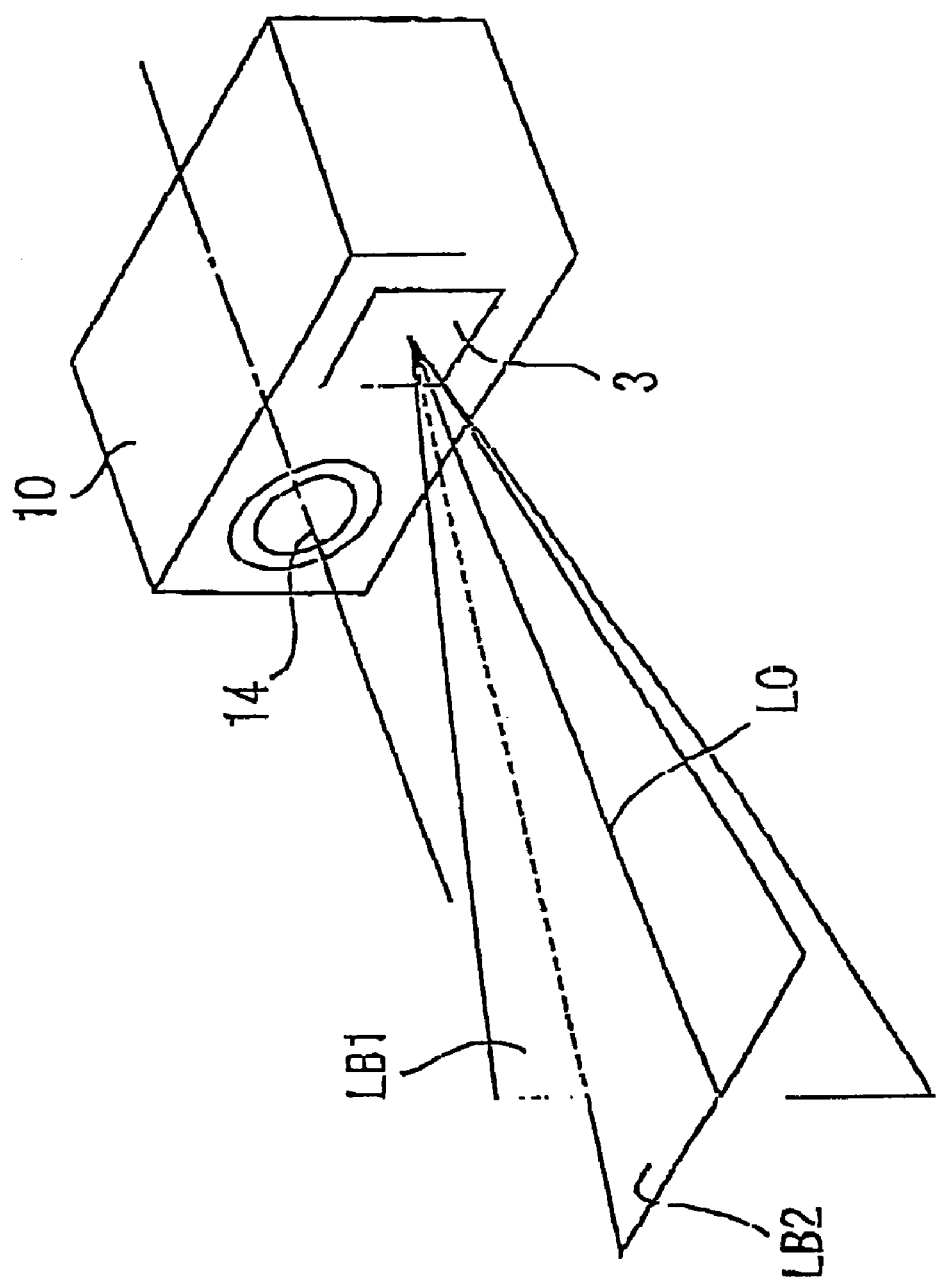

FIG. 3 shows the positional relation among two planes carrying the first and second laser slit beams LB1, LB2, a crossing line LC of those laser beams, the laser beam irradiation section 13 and the photo-detection section 14 or the like. It is assumed that calibration of the laser sensor 10 has been already finished, and its result (calibration data) is stored in the memory in the image processing unit 2 in advance. The calibration data on the laser sensor 10 contains data on the position and orientation (fixed values) of each of the first and second planes carrying the first and second laser slit beams LB1, LB2 with respect to the body of the laser sensor 10. The crossing line LC can also be calculated from the data on theses planes at any time.

Accordingly, if the relation between the coordinate system set on the body of the laser sensor 10 and the coordinate system set on the robot (the robot coordinate system, that is, the coordinate system fixed to the arm end of the robot 40, for instance) is obtained in advance, the position and direction on the robot coordinate system relating to each of the first and second planes carrying the first and second laser slit beans LB1, LB2 and the crossing line LC may be established. As well known per se, the above relation is generally expressed in the form of a 4×4 homogeneous transformation matrix, which is found from the calibration of the laser sensor. In this stage, the calibration of the laser sensor has been already finished, and the calibration data is stored in the memory in the image processing unit 2 in advance.

Figure 4:
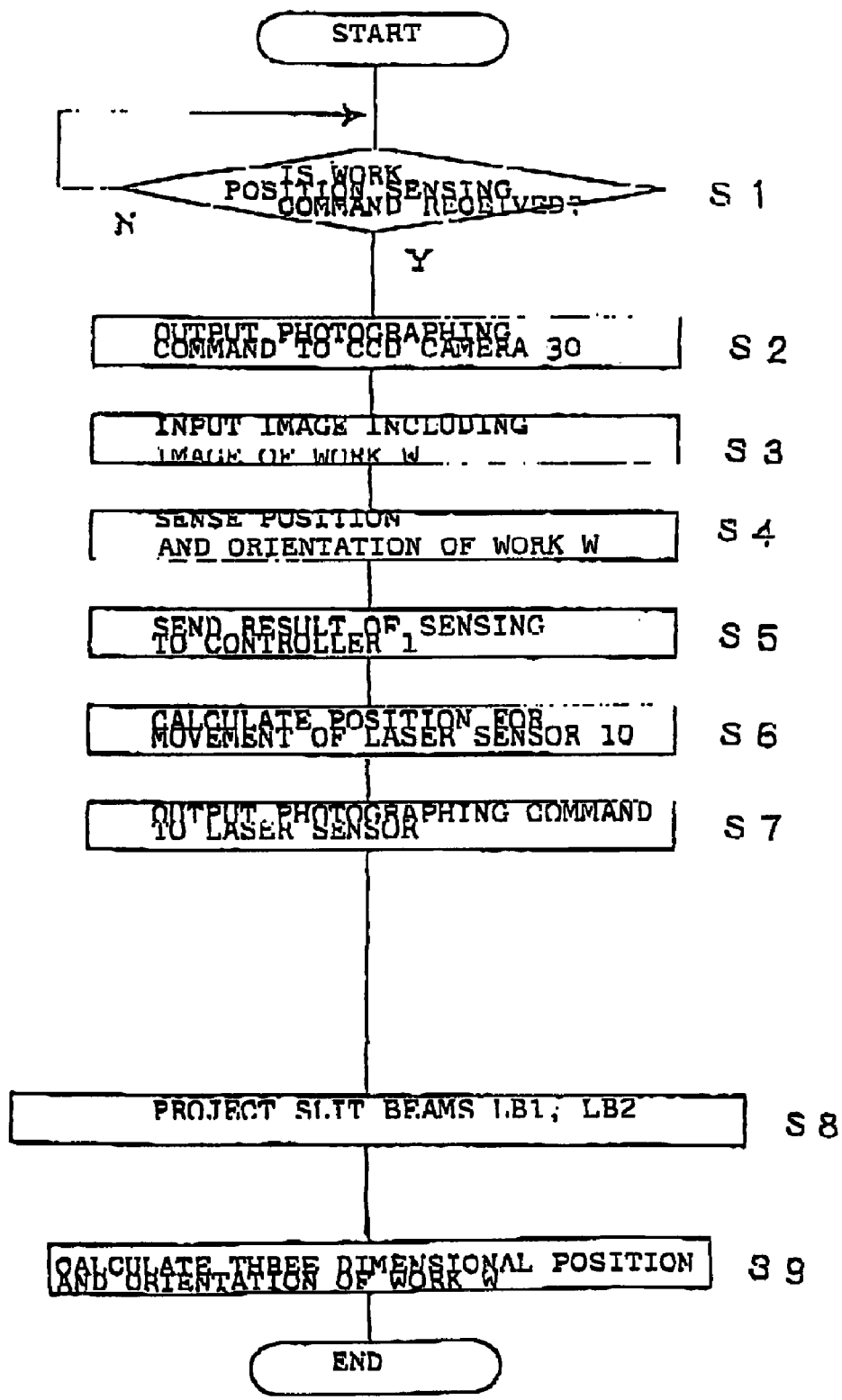
FIG. 4 is a flow chart for explaining a process of the operation of the position-orientation recognition device of FIG. 1.
Figure 5:
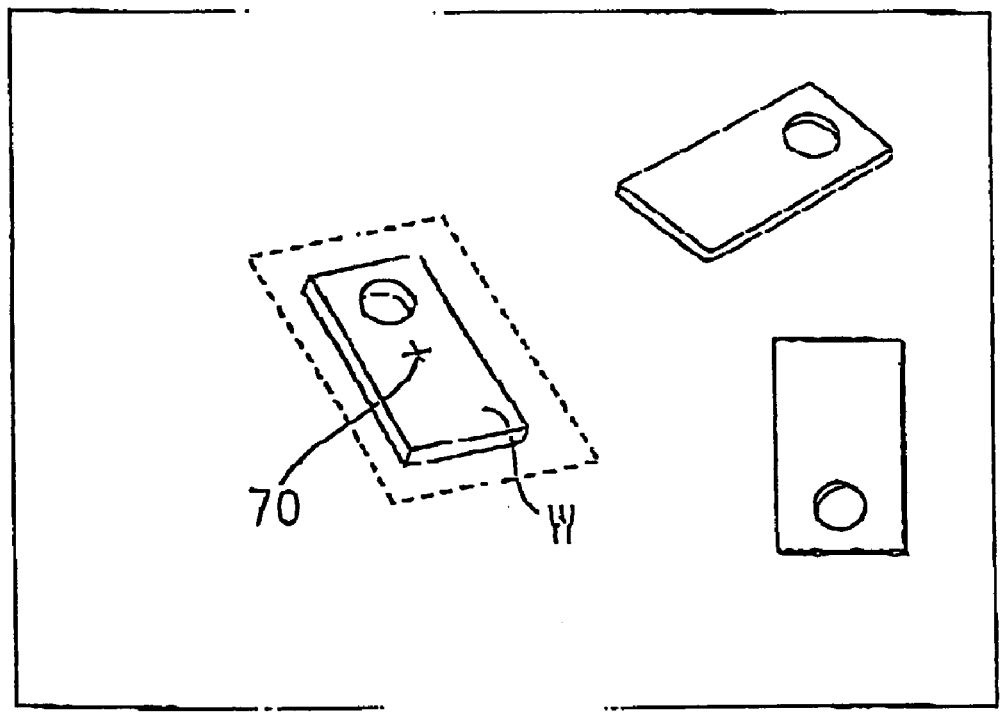
FIG. 5 is a view showing a two-dimensional image obtained by a first sensor means in the position-orientation recognition device of FIG. 1.
Figure 6:
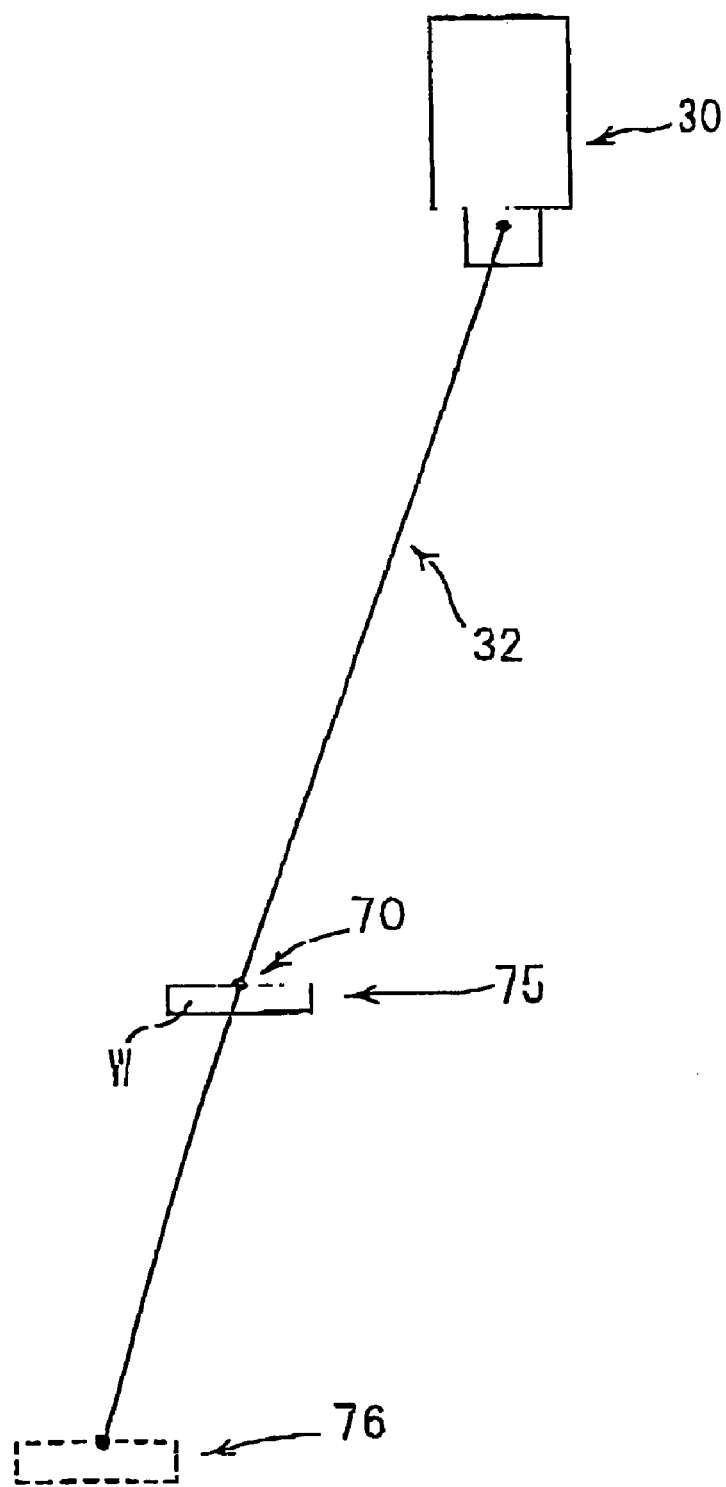
FIG. 6 is a view showing the relation between a line of sight and a target work.

A description will flow be given of a process of the operation of the position-orientation recognition device according to the present embodiment with reference to FIGS. 4 to 6.

The image processing unit 2 is waiting for a work sensing command to be sent from the robot controller 1 (Step S1). If the image processing unit 2 receives this work sensing command, a processing sequence for sensing the work is started to output a photographing command to the CCD camera 30 (Step S2). Subsequently, a two-dimensional image of the whole work pallet 50, including an image of the work W, is obtained for storage into the frame memory in the image processing unit 2 (Step S3).

FIG. 5 shows an example of the image thus obtained. In FIG. 5, reference numeral 70 denotes a representative point (a center of gravity of a work contour image, for instance) of the sensed work W, and the two-dimensional image position (u70, v70) of the representative point 70 is found with an image processor in the image processing unit 2. Further, a line of sight 32 (see FIG. 6) corresponding to the two-dimensional image position (u70, v70) of the representative point is calculated from the data obtained by calibration.

Since the point 70 representative of the work W exists on the line of sight, the position and orientation (an equation on the work coordinate system) of this line of sight correspond to "(information on) the position and orientation of the work W" which has been recognized in this stage. In this process, data obtained by transforming the information of the position and orientation of the work W into data on the robot coordinate system is required (Step S4). Incidentally, coordinate system setting data (the 4×4 homogeneous transformation matrix representing the relation between the robot coordinate system and the work coordinate system) stored in the memory of the robot controller 1 is used for the above transformation.

It is to be noted in this stage that the position of the work W represented by the point 70 remains uncertainty. That is, as shown in FIG. 6, although the three-dimensional spatial position of the work W (the representative point 70) is limited to be on the line of sight 32 according to the principle of perspective transformation, the distance between the work W and the camera 30 remains unknown. Thus, it is not possible to determine whether the work W is at a position 75 on the line of sight or a position 76 more remote from the camera 30 than the position 75, for instance.

Information (robot coordinate system information) of the line of sight 32 is sent to the robot controller 1 as information representing "a straight line connecting the first sensor means with the target work" (Step S5).

Subsequently, the position and orientation of the laser sensor 10 (the second sensor means) mounted to the robot 40, which is suitable to recognize (measure) the target work W, are calculated (Step S6) The above calculation of the position and orientation may be performed in the robot controller 1. One of the requirements used for this calculation is to "cause the line of sight 32 to agree with the crossing line LC (see FIG. 3)". An additional condition as to how distant the laser sensor 10 should be placed may by fulfilled by imposing an appropriate condition in advance.

The additional condition will be fulfilled by setting the work coordinate system so that the X-Y plane thereof is placed on the pallet 50 and then setting "the Z-coordinate of the position of the robot 40 oil the work coordinate system to a fixed value Z0". The robot controller 1 moves the robot 40 to the position and orientation calculated under these conditions. Incidentally, information specifying "direction" of the crossing line LC of the laser sensor 10 is required. However, this requirement is fulfilled by imposing a condition on one component (on the work coordinate system) of the orientation of the robot 40 (or by designating a robot orientation so that the laser sensor looks down).

On completion of movement of the robot, the laser sensor 10 is placed in a ready state for irradiation of the laser slit beams LB1, LB2 where the crossing line LC of these beams will agree with the line of sight 32 and further the crossing line LC will meet the target work at the point 70.

After the completion of movement of the robot, the robot controller 1 informs the image processing unit 2 of the completion of movement. Then, the image processing unit 2 outputs a photographing command (an operation command) to the laser sensor 10 (Step S7). Then, the laser sensor 10 starts the operation to irradiate the laser slit beams LB1, LB2, and the crossing line LC of these beams meets the target work at the point 70 (Stop S8).

In the present embodiment, as the laser sensor 10 is a three-dimensional sensor the three-dimensional position of the target work represented by the point 70 can be measured. The orientation of the target work W can also be detected from the reflected image (on the photo detector 14a) corresponding to the laser slit beams LB1, LB2 (Step S9).

Thus, even if the work W is placed at an inclined posture on another work or the height of each work W is not uniform, the laser sensor 10 can detect the height and inclination of the work and so on. Accordingly, the position and orientation of the grasping portion in the robot 40 can be controlled based on the height and orientation of the work W.

Incidentally, if the work W was once detected on the crossing line LC of the laser sensor 10, more detailed information can be obtained easily by changing the position or the orientation of the robot 40 slightly and then carrying out measurement under a condition where the crossing line LC is incident on a point other than the point 70.

A description will now be given of the outline of a three-dimensional position-orientation recognition device according to a second embodiment of the present invention with reference of FIG. 7 The device of the second embodiment is suited for a case where the size of a pallet 50 (the range to be covered with the wide area sensor) is not quite large.

Figure 7:
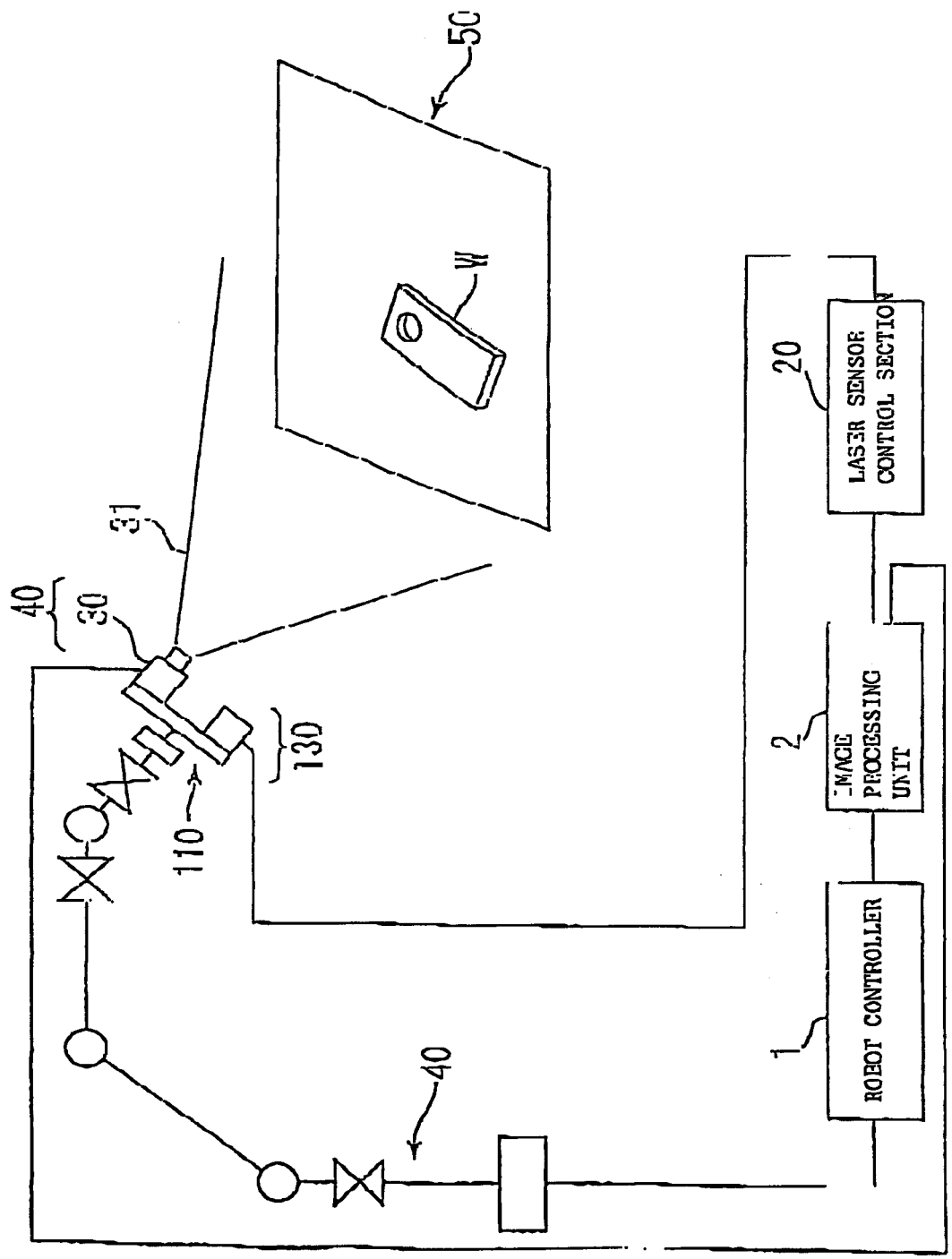
FIG. 7 illustrates an outline of the overall arrangement of a three-dimensional position orientation recognition device according to a second embodiment of the present invention.

A difference between the second embodiment of FIG. 7 and the first embodiment of FIG. 1 is that the camera 30 is mounted on the robot 40 as a photo-detection section 140 of a laser sensor 110, in the case of the second embodiment, to meet a requirement that the photo-detection section should also servo as the first sensor means. A laser beam irradiation section 130 of FIG. 7 is similar to the laser beam irradiation section 13 of the laser sensor 10 of FIG. 1. As for the other components, the device of FIG. 7 and that of FIG. 1 have the common structures.

However, system operating software stored in the image processing unit 2 or the robot controller 1 is altered such that the CCD camera 30 of the laser sensor 110 can be switched between a first mode (similar to that of the first embodiment) used for obtaining the two-dimensional image at the time of photographing and a second mode for sensing the reflected light of the laser slit bean from the laser sensor 110. Further, it is assumed that calibration of the photo-detection section (note that this photo-detection section is provided with an imaging lens) 140 has already been finished similarly to the calibration of the CCD camera 30, and that data obtained by calibration has already been stored in a memory of the image processing unit 2.

The outline of a process of the operation of the position recognition device according to the second embodiment is described below. However, it should be noted that description of portions which are the same as the operations of the position-orientation recognition device according to the first embodiment will not be repeated here as far as possible.

When the image processing unit 2 receives a work sensing command from the robot controller 1, an operation command in a normal photographing mode is outputted to the laser sensor control section 20. Then, a two-dimensional image of the whole work pallet 50, including an image of the work W, is obtained for storage into a frame memory in the image processing unit 2.

FIG. 5 shows an example of the image thus obtained. Similarly to the above first embodiment, the line of sight 32 is calculated based on the position (u70, v70) of the representative point 70 on the two-dimensional image by using data obtained by calibration.

Information (on the robot coordinate system) of the line of sight 32 (that is, an optical axis of the photo-detection section 140 of the laser sensor 110) is sent to the robot controller 1 as information representing "a straight line connecting the first sensor means with the target work".

Subsequently, the position and orientation of the work W with the laser sensor 110 (the second sensor means) mounted to the robot 40, which is suitable to recognize (measure), is calculated. This calculation may be performed in the robot controller 1. The conditions to be applied to this calculation may be similar to the conditions to be applied to the calculation in the case of the first embodiment. That is, those conditions include a requirement that "the line of sight 32 should agree with the crossing line LC (see FIG. 3)" and an additional condition for determining how distant the laser sensor 110 should be placed.

Upon completion of movement of the robot, the robot controller 1 informs the image processing unit 2 of the completion of movement, and the image processing unit 2 outputs a photographing command in a laser slit beam photographing mode to the laser sensor 110. Then, the laser sensor 110 starts operation to irradiate the laser slit beams LB1, LB2, and the crossing line LC meets the target work 70 at the point 70. The reflected light of the laser slit beams LB1, LB2 forms an image on the photo detector of the CCD camera 30. The image processing unit 2 obtains the three-dimensional position and orientation of the target work W after analyzing the result of sensing according to the software processing for performing the normal functions of the laser sensor 110.

Although the three-dimensional sensor is used as the second sensor means in the above two embodiments, it is to be understood that a two-dimensional sensor can also be used depending on the use. Even in a case where such a two-dimensional sensor is employed, the position and orientation of the second senor means suitable for recognition of the target work are determined based on the "straight line connecting the target work with the first sensor" in the same way as in the case where a three-dimensional sensor is employed.

Although the robot is used as the transfer means of the sensor in the above embodiments, it is to be understood that other transfer means which can control the position and orientation of the sensor (for example, a XYZ table of which orientation is controllable) can also be used.

According to the present invention, even in a case where the position, height and orientation of the target work are not specified, the position and orientation of the second sensor means for recognition can be properly determined based on "the straight line connecting the target work with the first sensor" determined by using the two-dimensional image obtained by the first sensor means. Thus, the position-orientation recognition device of the present invention makes much for automation of various operations.

What is claimed is:

1. A position-orientation recognition device including a first sensor means for obtaining two-dimensional information within a target area and a second sensor means for obtaining two-dimensional or three-dimensional information within a relatively narrower target area than said target area, comprising:

an image processing unit for finding a spatial straight line connecting a single point of a target work with said first sensor means based on two-dimensional information including information on said target work, the information comprising the single point of said target work, obtained by said first sensor means, and the position and orientation of said first sensor means;

means for finding a position and an orientation of said second sensor means, which permits said second sensor means to find the position and orientation of said target work, from said spatial straight line; and means for moving said second sensor means to the position and orientation thus found;

wherein said second sensor means obtains two dimensional information of the target work or three-dimensional position and orientation information of the target work to recognize the two-dimensional or three-dimensional information of the target work, after said means for moving moves the second sensor means to said found position and orientation, said found position of the second sensor means is a position on said spatial straight line, and said found orientation of the second sensor means being an orientation in a direction matching said spatial straight line.

2. The position-orientation recognition device according to claim 1, wherein said second sensor means is designed to obtain two-dimensional information and is also used as the first sensor means.

3. The position-orientation recognition device according to claim 1, wherein said second sensor means has a beam projecting means and a photo-detection means and is provided with a function for three-dimensional measurement of the position and orientation.

4. The position-orientation recognition device according to claim 3, wherein said photo-detection means of said second sensor means is a two-dimensional sensor for obtaining two-dimensional information.

5. The position-orientation recognition device according to claim 4, wherein said second sensor means serves as the first sensor means.

6. The position-orientation recognition device according to claim 3, wherein the position and orientation of said second sensor means for recognizing said target work are determined such that the direction of irradation from said beam projecting means corresponds to said spatial straight line.

7. The position-orientation recognition device according to claim 1, wherein the position and orientation of said second sensor means for recognizing said target work are determined such that the direction of an optical axis of said second sensor corresponds to said spatial straight line.

8. The position-orientation recognition device according to claim 1, wherein the image processing unit or the means for finding the position and orientation of said second sensor means is provided in a robot controller of an industrial robot.

9. A position-orientation recognition device according to claim 1, wherein said transfer means is an industrial robot.

10. A method for three-dimensional position-orientation recognition, comprising:

defining a straight line connecting a first sensor for obtaining two-dimensional information with a single point of a target work for recognition in a three-dimensional space, by using said first sensor to detect the single point of the target work;

moving a second sensor for obtaining three-dimensional information within said space up to the position and orientation enough to recognize the target work according to information of said straight line; and obtaining three-dimensional information of said target work with the second sensor which has reached the position and orientation enough to recognize said target work.

* * * * *

UNITED STATES PATENT AND TRADEMARK OFFICE
CERTIFICATE OF CORRECTION

PATENT NO. : 7,171,041 B2  Page 1 of 1
APPLICATION NO. : 09/950794
DATED : January 30, 2007
INVENTOR(S) : Atsushi Watanabe et al.

It is certified that error appears in the above-identified patent and that said Letters Patent is hereby corrected as shown below:

Title Page, Column 2 (Abstract), Line 3, change "thee" and --the--.
First Page, Column 2 (Abstract), Line 9, change "eight." to --sight.--.
First Page, Column 2 (Abstract), Line 13, change "positional" to --position--.
Column 1, Line 64, change "senor" to --sensor--.
Column 2, Line 20, change "sponsor" to --sensor--.
Column 2, Line 21, change "line" to --line,--.
Column 2, Line 43, change "three dimensional" to --three-dimensional --.
Column 2, Line 46, change "that;" to --that--.
Column 3, Line 8, after "two-dimensional" change "image" to --image.--.
Column 3, Line 38, change "fist" to --first--.
Column 3, Line 39, change "moans" to --means--.
Column 4, Line 30, after "industrial" insert --robot (which will be hereinafter simply referred to as a--.
Column 4, Line 47, change "CCD)" to --CCD--.
Column 5, Line 25, change "tho" to --the--.
Column 5, Line 39, change "theses" to --these--.
Column 5, Line 48, change "beans" to --beams--.
Column 5, Line 55, change "flow" to --now--.
Column 6, Line 51, change "oil" to --on--.
Column 6, Line 54, change " "direction" " to --"the direction"--.
Column 7, Line 5, change "(Stop" to --(Step--.
Column 7, Line 7, change "sensor" to --sensor,--.
Column 7, Line 28, after "FIG. 7" insert --.--.
Column 7, Line 37, change "servo" to --serve--.
Column 7, Line 48, change "bean" to --beam--.
Column 10, Line 7, change "irradation" to --irradiation--.

Signed and Sealed this

Eighth Day of May, 2007

JON W. DUDAS
*Director of the United States Patent and Trademark Office*